Aug. 21, 1951  C. J. HOLM  2,564,975
REEL FOR FISHING RODS
Filed Oct. 8, 1947  2 Sheets—Sheet 1

Inventor:
C. J. Holm
By E. F. Wenderoth
Atty

Aug. 21, 1951    C. J. HOLM    2,564,975
REEL FOR FISHING RODS
Filed Oct. 8, 1947    2 Sheets—Sheet 2

Inventor:
C. J. Holm

Patented Aug. 21, 1951

2,564,975

UNITED STATES PATENT OFFICE 2,564,975

REEL FOR FISHING RODS

Carl Julianus Holm, Trondheim, Norway

Application October 8, 1947, Serial No. 778,562
In Norway March 19, 1945

Section 1, Public Law 690, August 8, 1946
Patent expires March 19, 1965

3 Claims. (Cl. 242—84.6)

The present invention relates to reels for fishing rods embodying new features.

Various objects and improvements will be apparent from the following detailed description of a single preferred embodiment of the invention taken together with the accompanying drawings in which.

Figure 1:
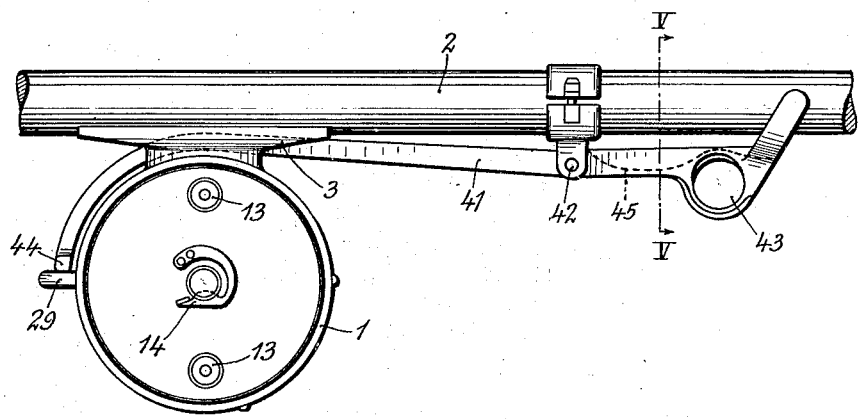
Fig. 1 is a partial side elevation on a reduced scale of a fishing rod with a reel mounted on the underside.

The drum housing 1 is in the form of an open box with perforated side walls and is secured to rod 2 by means of bracket 3. Centrally in the housing there is mounted a stationary spindle 4 secured by means of a nut 5 to the bottom part of the housing. On spindle 4 a sleeve 6 is rotatably mounted and which is kept in position on the spindle by means of an elastic split annular disk 8 which fits into a groove in spindle 4. A small axial clearing, as indicated at 7, between shaft 4 and sleeve 6, permits the latter to rotate easily.

Figure 3:
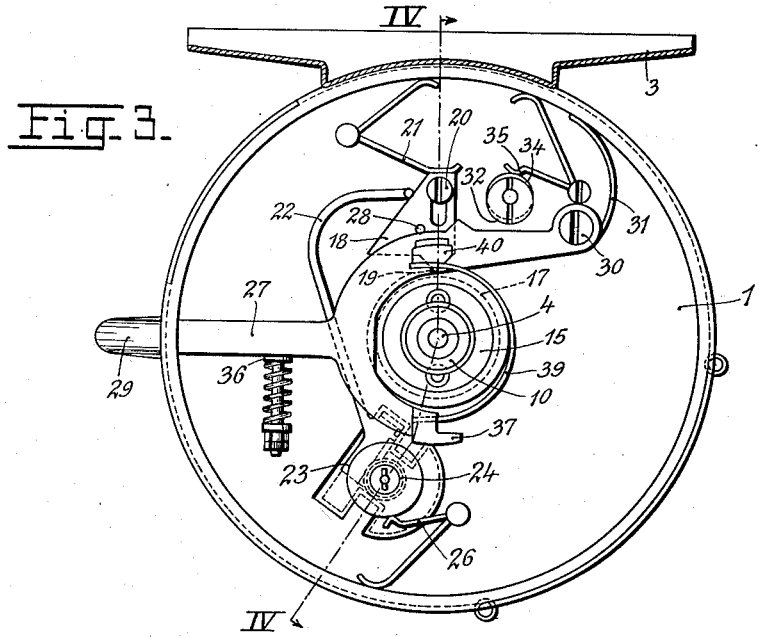
Fig. 3 illustrates on a larger scale the reel housing seen from the open end and with the drum removed.
Figure 4:
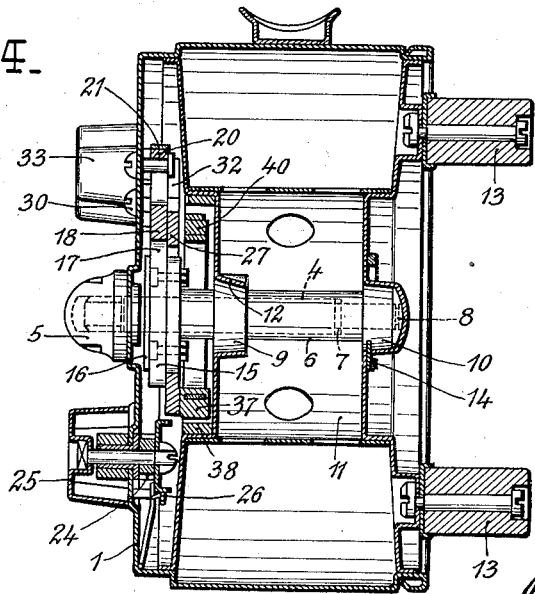
Fig. 4 is a section through the reel with drum mounted therein, taken on the line IV—IV of Fig. 3.

Near the bottom of the housing there is secured to flange 15 of the sleeve 6, a free wheel 16 which takes part in the rotation of the drum. The free wheel 16 is engaged in the usual manner (not shown) so that it carries with it the enclosing pawl wheel 17 when the drum rotates for paying out line (counterclockwise in Fig. 3), but has no connection with the pawl wheel when rotation takes place in the opposite direction. Pawl 18 has a point 19 which engages the teeth on the outside of pawl wheel 17. Pawl 18 by means of a slot guide is connected to a stationary spindle 20, so that it may move radially with relation to pawl wheel 17. It is acted on firstly by a spring 21, which presses it towards the wheel, and secondly by a spring 22, which acts approximately tangential to a sloping flat of the pawl. Spring 22 is mounted on a rack 23 guided in a depression in housing 1 and engaging a pinion 24 mounted on a shaft carrying an exterior actuating knob 25 and a pawl wheel engaged by a stopping spring 26. Pawl 18 can be released by means of actuating arm 27 which is pivotally mounted on stationary spindle 30 and being acted on by a weak spring 31 so that it engages a pin 28 on pawl 18 from the underside. At its free end arm 27 extends through housing 1 and carries a handle 29. The clockwise pivoting of arm 27 is limited by an adjustable stop formed by an eccentric 32 mounted on a spindle which may be rotated by means of an exterior turning knob 33 and carries a pawl wheel 34 engaged by a stopping spring 35. On pivoting of arm 27 counterclockwise it abuts against a yielding stop 36.

On a lower branch, the sleeve arm 27 carries a brake shoe 37 which is contactable with the inside of a brake ring 38 mounted in the drum 11, and also a spring 39, the free end of which carries on the upper side of the shaft another brake shoe 40 which can engage ring 38.

The operation of the pawl mechanism is as follows:

When the reel is to be used for casting, arm 27 is lifted by means of handle 29 until it engages eccentric 32 which is so placed that the pawl will always be free from pawl wheel 17. In the moment the pawl is free, brake shoe 40 is brought in yielding contact against ring 38 so that a suitable weak braking action for the throw is obtained which may be adjusted by turning the eccentric by means of knob 33.

When the throw has been completed, handle 29 is released, whereby springs 21 and 22 push pawl 18 and arm 27 back to their original position, the pawl engaging pawl wheel 17, and as the drum is now rotating for giving off line, the free wheel is locked and the pawl works against the springs so that drum 11 is arrested immediately and the reel is adjusted (by means of knob 25) for the resistance necessary to obtain a sufficient hold on a fish. Due to the engagement with spring 36, the impact between tooth wheel and pawl is softened. If it is desired to brake the reel by hand power, arm 27 is depressed until brake shoe 37 engages ring 38.

With this reel the fish is accordingly braked with the same arm used for releasing the pawl mechanism at the beginning of the throw and for braking the throw. In many known casing reels in which the pawl is mounted in its actuating arm, this obviously is not possible as a downward movement of the arm will only result in pressing the pawl harder against the tooth wheel so that the wear is increased and the impacts between pawl and pawl wheel are increased for each throw.

Figure 2:
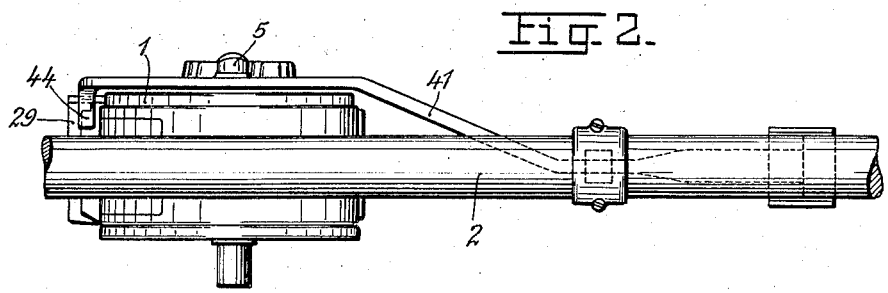
Fig. 2 is a top plan view of the rod and reel of Fig. 1.
Figure 5:
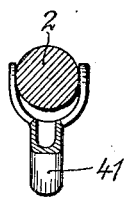
Fig. 5 is a section on the line V—V of Fig. 1.

On Figures 1, 2 and 5 there is illustrated a possible connection between the brake on the reel and the fingers of the hand with which the rod is held and which it is most convenient to use.

For this purpose there is used a lever 41 passing along the rod and mounted on a bracket at 42. One arm of the lever 41 is guided on rod 2 with a fork as shown in Fig. 5, and is provided with a finger hole 43, whereas the free end 44 of the other arm can act on the handle or brake knob 29. The lever is maintained out of engagement with the brake knob by means of a spring 45 until it is desired to use the brake. The braking then takes place with the most convenient finger on the hand with which the rod is held, and by this arrangement a very sensitive brake action is obtained, whereas at the same time the other hand is liberated so that it can be used entirely for reeling. Lever 41 may also be placed inside the rod instead of outside on the same.

I claim:

1. In a reel for fishing rods of the type comprising a line drum, a spring actuated pawl and a pawl wheel cooperating therewith and an actuating arm for the pawl, said actuating arm engaging said pawl by movement in one direction only so as to disengage said pawl from said pawl wheel, a brake drum connected with said line drum, brake shoes on said actuating arm on two sides of said brake drum, one of said brake shoes being adapted to engage said brake drum connected with said line drum upon actuation of said arm when moved in a direction disengaging said pawl from said pawl wheel and the other when moved in the opposite direction.

2. A reel for fishing rods comprising a housing, a line drum rotatably mounted in said housing, a spring actuated pawl secured to said housing, a pawl wheel rotatably mounted in said housing for coaction with said pawl, an actuating arm for said pawl pivotally mounted in said housing, said actuating arm having two branches thereon, a stud on said pawl, one said branch on said actuating arm engaging said stud on said pawl upon movement in one direction only of said actuating arm, said pawl being disengageable from said pawl wheel by movement of said actuating arm in said one direction, a brake drum connected to said line drum, brake shoes attached to each said branch of said arm and movable thereby for contact with said brake drum, one said brake shoe being engageable with said brake drum upon movement of said arm in said one direction to disengage said pawl and the other of said brake shoes being engageable with said brake drum when said arm is moved in the opposite direction.

3. A reel for fishing rods as claimed in claim 2, said pawl having a slot therein, a stud inserted through said slot and radially slidably securing said pawl to said housing, a first spring in said housing pressing said pawl radially toward said pawl wheel, a second spring in said housing angularly pressing said pawl toward said pawl wheel, means for varying the pressure of said second spring against said pawl, said first and second spring constituting the means for spring actuation of said pawl, an adjustable cam rotatably secured in said housing in proximity to one said branch of said actuating arm and being adjustable for limiting the movement of said arm, said brake shoes contactable with said brake drum upon actuation of said arm to release said pawl being brought into contact with said brake shoe when said pawl is free from said pawl wheel.

CARL JULIANUS HOLM.

REFERENCES CITED

The following references are of record in the file of this patent:

FOREIGN PATENTS

| Number | Country | Date |
|---|---|---|
| 21,131 of 1913 | Great Britain | June 11, 1914 |
| 288,101 | Great Britain | Apr. 5, 1928 |